(No Model.) 3 Sheets—Sheet 1.

G. W. BEARDSLEE.
DYNAMO ELECTRIC MACHINE.

No. 265,004. Patented Sept. 26, 1882.

Witnesses
James F. Tobin
Harry Drury

Inventor
Geo. W. Beardslee
by his Attys
Howzman and Jones (No Model.)  3 Sheets—Sheet 2.

G. W. BEARDSLEE.
DYNAMO ELECTRIC MACHINE.

No. 265,004.  Patented Sept. 26, 1882.

Witnesses
James F. John
Harry Drury

Inventor
George W. Beardslee
by his Attorney
Howson and Sons (No Model.)

3 Sheets—Sheet 3.

G. W. BEARDSLEE.
DYNAMO ELECTRIC MACHINE.

No. 265,004. Patented Sept. 26, 1882.

Witnesses:
Hamilton Turner
James J. Tobin

Inventor:
George W. Beardslee
by his Attorneys
Howson and Sons

United States Patent Office.

GEORGE W. BEARDSLEE, OF BROOKLYN, NEW YORK, ASSIGNOR TO WILLIAM F. JOBBINS, OF EAST ORANGE, NEW JERSEY.

DYNAMO-ELECTRIC MACHINE.

SPECIFICATION forming part of Letters Patent No. 265,004, dated September 26, 1882.

Application filed May 29, 1882. (No model.)

*To all whom it may concern:*

Be it known that I, GEORGE W. BEARDSLEE, a citizen of the United States, and a resident of Brooklyn, New York, have invented certain Improvements in Dynamo-Electric Machines, of which the following is a specification.

My invention consists of certain improvements in the construction of dynamo-electric machines, as more fully described hereinafter.

Figure 1:
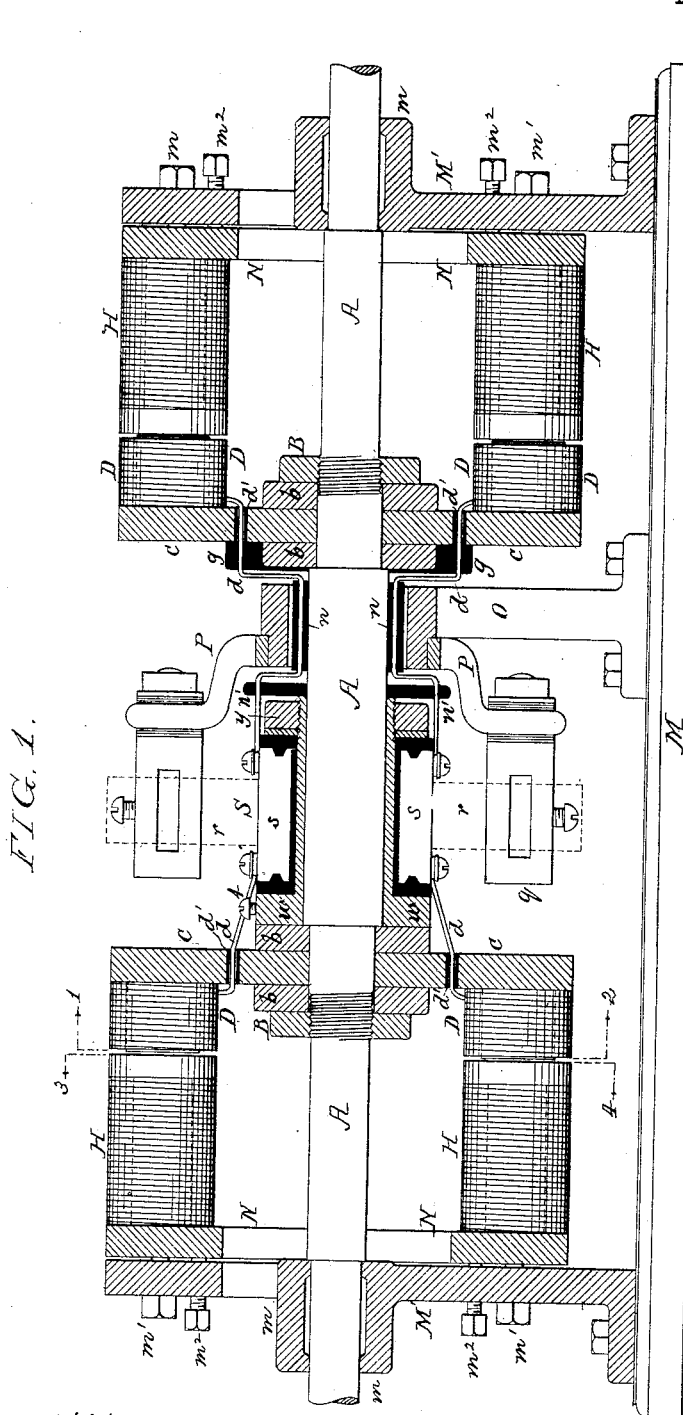
Figure 2:
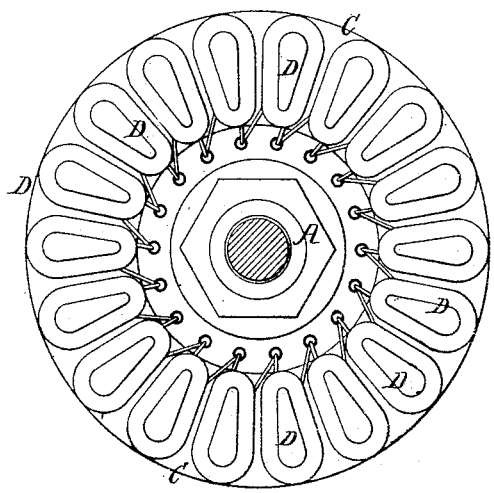
Figure 3:
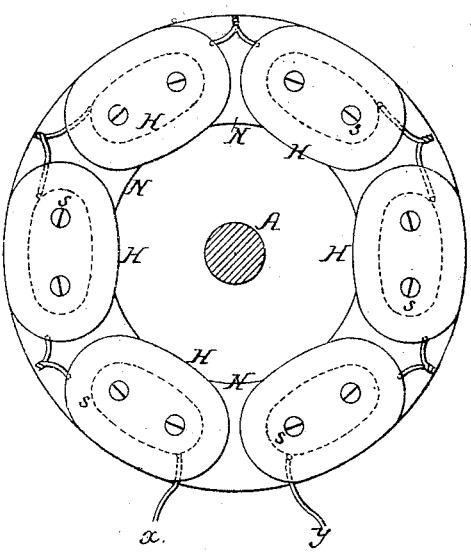
Figure 4:
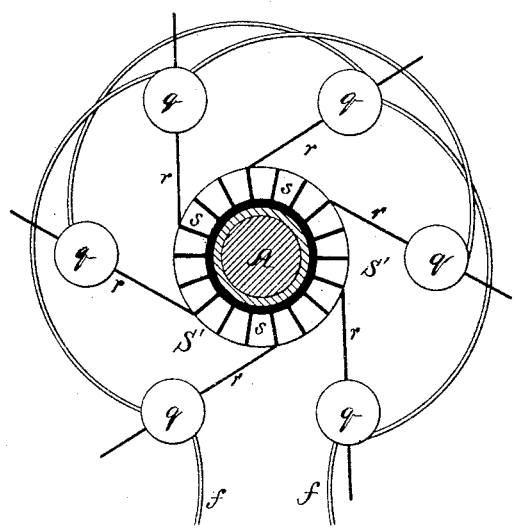
Figure 5:
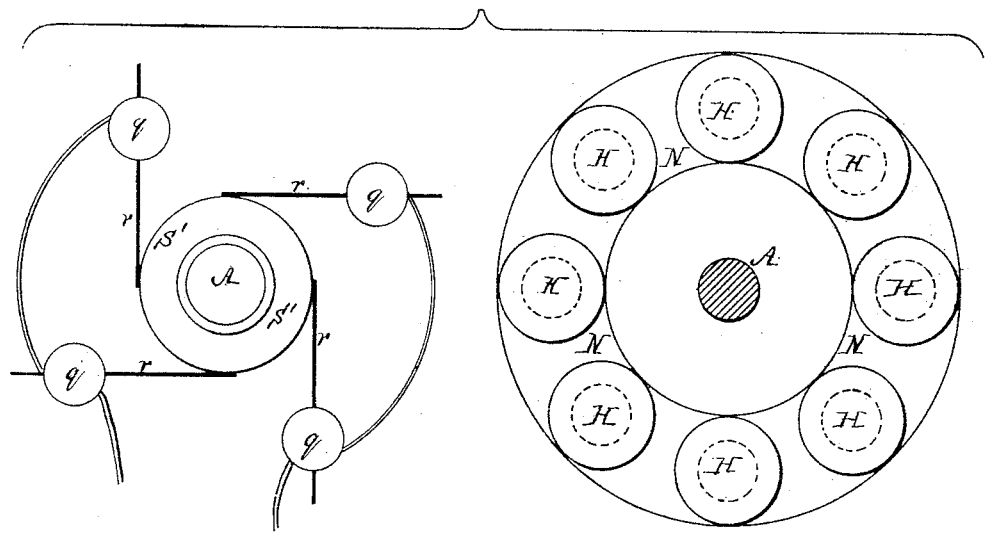

In the accompanying drawings, Figure 1, Sheet 1, is a longitudinal section of my improved machine. Fig. 2, Sheet 2, is a section on the line 1 2, Fig. 1; Fig. 3, a section on the line 3 4, Fig. 1; Fig. 4, a diagram of the commutator, wires, brushes, and connections; and Fig. 5, diagrams of a modified arrangement of field-magnets and commutator and brushes.

M is the base of the machine, and M' M' are two end frames, provided with bearings $m$ for the shaft A, which carries the armatures or generating-wheels and commutator and driving-pulley, while the field-magnets are secured to the end frames, M'. In this machine there are two sets of field-magnets, two armatures, and one commutator between the two armatures. The spools H of the field-magnets—six in each set in the present instance—have their cores secured to or they form part of a ring, N, of iron, which is secured to the end frame, M', by bolts $m'$, while adjusting-screws $m^2$, bearing on the ring, permit any desired adjustment of the ring N and field-magnets toward or from the armature-wheel with its electro-magnets D. The cores of the electro-magnets D composing each armature are secured to or form part of an iron disk, C, which is mounted on the shaft A, being secured with intervening washers $b\ b$ between a shoulder on the shaft and a screw-nut, B.

The commutator S consists of a shouldered sleeve, $w$, secured to the shaft by a screw, 4, or other means, and the commutator-plates $s$, arranged radially around the sleeve, and held in place with their insulating-pieces between the shoulder on the said sleeve and a screw-nut, $y$, on the end of the sleeve. In the present instance I have shown six commutator-brushes, $r\ r$, held by slotted bolts $q$, carried by but insulated from the arms of the spider P, which is mounted on the standard O, fixed to the base M. The wires from the united terminals of the magnets of both armatures are connected to the same commutator-plates, $s$. These wires $d$ pass through insulated passages $d'$ in the disks C, and in the case of the wheel adjoining the standard O the wires then pass through holes in an insulating-disk, $g$, thence through the insulating-sleeve $n$, which is secured to the shaft and runs clear of the standard O. The wires also preferably pass through holes in an insulating guide-disk, $n'$, and are then secured to their commutator-plates. The wires from the other disk C pass directly from the insulated passages $d'$ to the same commutator-plates.

As shown in Fig. 2, the inner terminal of one coil of one magnet of each generating-wheel is connected to the outer terminal of the next, making one continuous spool of the whole series, and the united wires of each pair lead off to the commutator. In the present instance I have shown each wheel as having eighteen spools, making thirty-six spools connected to the eighteen commutator-plates.

As I have already said, there are six spools in each set of field-magnets, connected as shown in Fig. 3, the terminal wires $x\ y$ being connected to suitable binding-posts, and the outer coils of the first and second spools being connected, while the inner coils of the second and third are connected, and so on alternately.

In machines where the spools of the armature are connected up in a continuous series, as described, it has been usual to employ only one pair of commutator-brushes, thus giving to the induced current the full intensity of one-half of all the spools of each generating-wheel.

By using two or more pairs of commutator-brushes and arranging the field-magnets into a corresponding number of pairs, however, I can vary the intensity of the current in relation to the volume at pleasure.

In the arrangement shown in Figs. 2, 3, and 4 of the drawings there are three pairs of north and south poles of field-magnet coils in each set and three pairs of commutator-brushes, and on the other hand eighteen poles on each generating-wheel and eighteen commutator-plates. The six brush-holders, as shown in Fig. 4, are connected together alternately—that is, the first, third, and fifth are connected and the second, fourth, and sixth are connected, while the terminal wires $f\ f$ are connected to the first and sixth. With the arrangement described the intensity is only that of three spools, while the volume is that given by six groups of three each. This arrangement has also the advantage of enabling me to use as fine wire for the spools of the generating-wheel as would be used in a much smaller machine— that is, one with fewer spools. To change the relative volume and intensity of the current in the machine it is necessary to change the number of pairs of brushes and also the number of pairs of poles in the field-magnets; but no change is made in the generating-wheel, whose coils remain connected up in continuous series, as described. In practice I change the number of poles by substituting other sets of field-magnets for those on the machine, the spools also being wound with proper-sized wire to give an increased resistance where the change is required to increase the intensity, for instance, or to give a less resistance where an increased volume is required. This change is readily accomplished, as the rings N, carrying the spools, can be easily removed and replaced by others having the desired number of poles and character of wire. For instance, I have shown in the diagram, Fig. 5, an arrangement of two pairs of brushes on the commutator, and of field-magnets with a like number of pairs of poles, there being two of the eight spools H to each pole-piece. No change, however, is made in the connections of the generating-wheel or armature.

I am aware that the subdividing of spools and pairs of poles has been carried out in machines where the terminals are connected to the rings of a commutator having alternating projections or teeth overlapping and corresponding with the spools of a generating-wheel; but in my machine I use two or more pairs of poles and brushes in connection with a commutator which has separate insulated segments or plates for the wires from the united terminals of the armature-spools, and the latter are connected together in continuous series.

I claim as my invention—

1. In a dynamo-electric machine, the combination of an armature or generating-wheel having its spools connected up in continuous series, and a commutator having separate insulated plates or segments, with two or more pairs of commutator-brushes, and field-magnets having a corresponding number of pairs of poles, all substantially as described.

2. A dynamo-electric machine having two sets of field-magnets and two armatures with one commutator, the terminals from both armatures being connected to the same commutator-plates.

3. The combination of field-magnets, armature, and commutator with standard O and insulating-disk $g$, and sleeve $n$ for the wires, substantially as specified.

4. The combination of the armature or generating-wheel and end plate, M', with ring N, carrying the field-magnets, and screws $m^2$ for adjusting said magnets toward or from the armature, all substantially as set forth.

In testimony whereof I have signed my name to this specification in the presence two subscribing witnesses.

GEO. W. BEARDSLEE.

Witnesses:
WALTER K. FREEMAN,
EUGENE F. BARNES.